United States Patent
Daton-Lovett

(10) Patent No.: US 11,142,964 B2
(45) Date of Patent: Oct. 12, 2021

(54) APPARATUS AND METHOD FOR JOINING IN A TUBE

(71) Applicant: RTL Materials Ltd., Lymington (GB)

(72) Inventor: Andrew Daton-Lovett, Lymington (GB)

(73) Assignee: RTL Materials Limited, Lymington (GB)

( * ) Notice: Subject to any disclaimer, the term of this patent is extended or adjusted under 35 U.S.C. 154(b) by 483 days.

(21) Appl. No.: 16/060,583

(22) PCT Filed: Dec. 6, 2016

(86) PCT No.: PCT/GB2016/053834
§ 371 (c)(1),
(2) Date: Jun. 8, 2018

(87) PCT Pub. No.: WO2017/098225
PCT Pub. Date: Jun. 15, 2017

(65) Prior Publication Data
US 2018/0371849 A1    Dec. 27, 2018

(30) Foreign Application Priority Data

Dec. 9, 2015 (GB) .................................. 1521688

(51) Int. Cl.
*B23K 20/233*    (2006.01)
*B29C 65/16*    (2006.01)
(Continued)

(52) U.S. Cl.
CPC ............ *E21B 17/206* (2013.01); *B23K 20/10* (2013.01); *B23K 20/233* (2013.01); *B23K 20/26* (2013.01);
(Continued)

(58) Field of Classification Search
CPC ................ B23K 26/067; B23K 26/082; B23K 26/0613; B23K 26/042; B23K 26/0643;
(Continued)

(56) References Cited

U.S. PATENT DOCUMENTS 4,016,393 A * 4/1977 Birdwell ................. B21C 37/08
219/61.11
4,863,091 A * 9/1989 Dubois .................... B21C 37/08
228/147

(Continued)

FOREIGN PATENT DOCUMENTS

CN    204328336 U    5/2015
EP    1529624 A1    5/2005
(Continued)

OTHER PUBLICATIONS

Winchester, D., "Radical Technology in the Pipeline," Offshore Engineer, Thomas Telford, London, GB, Jun. 1, 1999 (Jun. 1, 1999), pp. 19-21.
(Continued)

*Primary Examiner* — Christopher M Koehler
*Assistant Examiner* — Chris Q Liu
(74) *Attorney, Agent, or Firm* — Troutman Pepper Hamilton Sanders LLP

(57) ABSTRACT

The present invention relates to an apparatus and method for joining a longitudinal seam in a tube, to an apparatus and method of joining a longitudinal seam in a tube in a borehole, to an apparatus and method of repairing a tube and to a pig. In an aspect an apparatus is provided for joining a longitudinal seam in a tube. The apparatus (200) includes a spool (202) for progressively unwinding a coiled member (10) into an extended form (12). The member (10) transitions from a flat form when coiled (11) to a slit tube form when extended (12), in which form the member is resiliently (Continued)

biased. A joining device (214) is positioned downstream of the spool arranged to provide energy to a portion of the member in its extended form to cause heating so as to progressively join together the longitudinal edges of the slit tube as the member passes the joining device. A longitudinal seam (20) is thereby formed in the tube.

21 Claims, 9 Drawing Sheets

(51) Int. Cl.
| | |
|---|---|
| B29C 65/14 | (2006.01) |
| B29C 65/82 | (2006.01) |
| B29C 65/40 | (2006.01) |
| B23K 26/324 | (2014.01) |
| B29C 65/48 | (2006.01) |
| B23K 31/12 | (2006.01) |
| B23K 26/08 | (2014.01) |
| B29C 65/00 | (2006.01) |
| B29C 65/50 | (2006.01) |
| B29C 65/78 | (2006.01) |
| B23K 20/26 | (2006.01) |
| F16L 9/17 | (2006.01) |
| E21B 17/20 | (2006.01) |
| E21B 23/04 | (2006.01) |
| E21B 23/10 | (2006.01) |
| E21B 43/10 | (2006.01) |
| E21B 19/22 | (2006.01) |
| F16L 55/30 | (2006.01) |
| F16L 55/18 | (2006.01) |
| B23K 37/02 | (2006.01) |
| F16L 55/40 | (2006.01) |
| B23K 20/10 | (2006.01) |
| B23K 26/262 | (2014.01) |
| B29C 35/08 | (2006.01) |
| B29C 65/24 | (2006.01) |
| F16L 101/60 | (2006.01) |
| B29C 65/04 | (2006.01) |
| B29C 65/52 | (2006.01) |
| B29L 23/00 | (2006.01) |
| B29C 65/08 | (2006.01) |
| B29C 65/10 | (2006.01) |
| B23K 103/00 | (2006.01) |
| B23K 101/06 | (2006.01) |
| F16L 55/165 | (2006.01) |
| B29C 65/06 | (2006.01) |

(52) U.S. Cl.
CPC ........ *B23K 26/0846* (2013.01); *B23K 26/262* (2015.10); *B23K 26/324* (2013.01); *B23K 31/125* (2013.01); *B23K 37/02* (2013.01); *B29C 35/0805* (2013.01); *B29C 65/1412* (2013.01); *B29C 65/1435* (2013.01); *B29C 65/1458* (2013.01); *B29C 65/1635* (2013.01); *B29C 65/1658* (2013.01); *B29C 65/1677* (2013.01); *B29C 65/242* (2013.01); *B29C 65/40* (2013.01); *B29C 65/4815* (2013.01); *B29C 65/5057* (2013.01); *B29C 65/7894* (2013.01); *B29C 65/8292* (2013.01); *B29C 66/1122* (2013.01); *B29C 66/345* (2013.01); *B29C 66/4322* (2013.01); *B29C 66/49* (2013.01); *B29C 66/73921* (2013.01); *E21B 17/20* (2013.01); *E21B 19/22* (2013.01); *E21B 23/04* (2013.01); *E21B 23/10* (2013.01); *E21B 43/105* (2013.01); *F16L 9/17* (2013.01); *F16L 55/18* (2013.01); *F16L 55/30* (2013.01); *F16L 55/40* (2013.01); *B23K 2101/06* (2018.08); *B23K 2103/42* (2018.08); *B29C 65/04* (2013.01); *B29C 65/0618* (2013.01); *B29C 65/08* (2013.01); *B29C 65/10* (2013.01); *B29C 65/4835* (2013.01); *B29C 65/524* (2013.01); *B29C 65/7855* (2013.01); *B29C 66/3452* (2013.01); *B29C 66/71* (2013.01); *B29C 66/7212* (2013.01); *B29C 2035/0822* (2013.01); *B29C 2035/0855* (2013.01); *B29L 2023/22* (2013.01); *F16L 55/1653* (2013.01); *F16L 2101/60* (2013.01)

(58) Field of Classification Search
CPC ............ B23K 26/0853; B23K 26/0823; B23K 26/083; B23K 26/10; B23K 26/206; B23K 26/262; B23K 26/324; G02B 26/101; G02B 26/105; G02B 27/106; G02B 13/0095
USPC ............ 219/121.68, 121.69, 121.74, 121.76, 219/121.78, 121.6, 121.62, 121.8, 121.72, 219/121.75, 765, 770, 733, 764, 759, 730, 219/711
See application file for complete search history.

(56) References Cited

U.S. PATENT DOCUMENTS

| | | | | |
|---|---|---|---|---|
| 5,121,872 | A * | 6/1992 | Legget | ............... B21C 37/08 228/148 |
| 5,474,227 | A * | 12/1995 | Krengel | ............. B05B 13/0618 228/147 |
| 6,688,513 | B2 * | 2/2004 | Porcher | ............... B21C 37/0818 228/147 |
| 2002/0003173 | A1 | 1/2002 | Bauer et al. | |
| 2002/0087679 | A1 | 7/2002 | Pulley et al. | |
| 2002/0125302 | A1 | 9/2002 | Porcher et al. | |
| 2003/0039752 | A1 | 2/2003 | Winiewicz et al. | |
| 2006/0081613 | A1 * | 4/2006 | Panthofer | ............ B23K 13/025 219/613 |
| 2007/0267785 | A1 * | 11/2007 | Bellamy | ........... B29C 66/72343 264/512 |
| 2012/0248078 | A1 | 10/2012 | Zediker et al. | |
| 2012/0255933 | A1 | 10/2012 | McKay et al. | |
| 2015/0259911 | A1 | 9/2015 | Freebury et al. | |

FOREIGN PATENT DOCUMENTS

| | | |
|---|---|---|
| EP | 2944857 A1 | 11/2015 |
| GB | 2517130 A | 2/2015 |
| JP | H11226756 A | 8/1999 |
| KR | 101339286 B1 | 12/2013 |
| WO | 88/08620 A1 | 11/1988 |
| WO | 9529786 A1 | 11/1995 |
| WO | 97/35706 A1 | 10/1997 |
| WO | 99/62811 A1 | 12/1999 |
| WO | 99/62812 A1 | 12/1999 |
| WO | 02/25057 A1 | 3/2002 |
| WO | 2012168741 A1 | 12/2012 |
| WO | 2014/144887 A1 | 9/2014 |

OTHER PUBLICATIONS

International Search Report dated Sep. 5, 2017 in corresponding International Patent Application No. PCT/GB2016/053834.
British Search Report dated Jul. 7, 2016 in corresponding British Patent Application No. 1521688.0.
Further British Search Report dated Nov. 1, 2016 in corresponding British Patent Application No. 1521688.0.
Winchester, D.: "Radical technology in the pipeline," Offshore Engineer, Thomas Telford, London, GB, Jun. 1, 1999, ISSN: 0305-876X.

(56) References Cited

OTHER PUBLICATIONS

Examination Report dated Aug. 28, 2019 in corresponding European Patent Application No. 16813015.1.
Search Report dated Aug. 14, 2019 in corresponding European Patent Application No. 19165516.6.

* cited by examiner

APPARATUS AND METHOD FOR JOINING IN A TUBE

CROSS-REFERENCE TO RELATED APPLICATIONS

This application is a national phase filing under 35 U.S.C. § 371 of International Patent Application No. PCT/GB2016/053834, filed Dec. 6, 2016, which claims the benefit of British Patent Application No. 1521688.0, filed Dec. 9, 2015, each of which is incorporated herein by reference in its entirety.

BACKGROUND

The present invention relates to an apparatus and method for joining a longitudinal seam in a tube, to an apparatus and method of joining a longitudinal seam in a tube in a borehole, to an apparatus and method of repairing a tube and to a pig.

There are many situations where it is desired to deploy closed pipes, tubes, and the like. Examples include laying pipes transporting water or other fluids and lining existing pipes and boreholes, for instance in the oil industry. Currently, installation typically involves shipping many short lengths of fully formed pipe to the installation site and joining them together end to end. This is has a large overhead of time and effort and energy cost in shipping the bulky pipes to their final destination, particularly where the overall length of the pipe is to extend hundreds of meters or even kilometres. Also in the case of drilling boreholes in many cases the drill have to be withdrawn to allow the bore to have a pipe inserted, followed by the re-insertion of the drill and so on in a repetitive manner. The provision of a pipe that could be continuously deployed behind the drill would have clear economic benefits. This can be the case in a range of industries, from bores for oil and gas to conduits for electrical or communications cables and many other applications.

What is needed is improved ways of deploying pipes, tubes and the like.

SUMMARY

According to a first aspect of the present invention, there is provided apparatus for joining a longitudinal seam in a tube, the apparatus comprising:

a spool for progressively unwinding a coiled member into an extended form, wherein the member transitions from a flat form when coiled to a slit tube form when extended, in which form the member is resiliently biased;

a joining device positioned downstream of the spool arranged to provide energy to a portion of the member in its extended form to cause heating so as to progressively join together the longitudinal edges of the slit tube as the member passes the joining device and thereby form a longitudinal seam in the tube.

The flat coiled form allows easy transportation and storage of the material prior to forming into a closed tube by joining a longitudinal seam to close the edges of the slit tube. As used herein "tube" is intended to mean any pipe, pipe liner or other closed tubular structure. The tube can be formed progressively by joining the seam as it is unwound from the spool. This is advantageous when the tube is formed in situ where it is to be deployed, and particularly when formed in long lengths. In embodiments, the tube formed in this way may be kilometres or more in length. This has the capacity to vastly reduce the cost and energy considerations of shipping preformed pipes and pipe liners to the location of installation and the labour cost of joining short lengths of pipe together.

The member may formed from a sheet-like material having first and second longitudinal edges that is folded in on itself longitudinally to form a slit tube. Using a sheet-like material allows the member to have thin walls, promoting coiling.

Preferably, in the extended form, the member is resiliently biased to have abutting or overlapping longitudinal edges. Thus, the edges are held in position in contact with each other for being joined together by the natural resiliency of the member, which can help form a good join and greatly simplify the process of forming the seam. The slit tube, in transverse cross section, is generally curved. The cross section may be circular or oval. However, other cross sectional forms are possible. For example, the cross section can have straight portions whilst being generally curved. In principle, the cross section may be polygonal, such as rectangular or square. The precise shape of cross section chosen for the extended member is in practice likely to depend on the application of the tube product.

In embodiments, the member may comprise a plastic material, such as thermoplastics or other polymers. In embodiments, the member is a composite member, such as a laminar composite and/or a fibre reinforced composite. Such constructions allow thin, sheet-like members to be formed, which helps them coil, whilst still having sufficient strength when formed into the seamed tube.

In an embodiment, the member is a bistable reelable composite, being stable in its coiled, flat form and in its extended, slit tube form. In such embodiments, the member is resiliently biased in its coiled form as well as in its extended slit tube form, meaning that there is no need for a heavy-duty housing necessary to constrain the energy stored in the coil, and there is no risk of the coil "exploding" due to sudden release of the stored energy. This also helps promote a stable and predictable uncoiling of the member.

In an embodiment, the apparatus comprises a guide means to guide the edges into the desired abutting or overlapping relationship for joining. Thus, the slit tube form of the member in which it is residually biased may not be the final form in which the tube is joined and may not even be fully closed. In this embodiment, the final form of the tube in which it is joined may be attained with the aid of the external influence of the guide member in forcing the edges into the desired overlapping or abutting position. By forcing the member to a tighter curved cross section against its residual biased form before joining the seam, this may leave a residual stress in the tube which may be beneficial in some instances. For example where there is an external force acting to attempt to collapse the joined pipe, such as in deep bores containing fluids that will exert a hydrological pressure, then a pipe that is pre-stressed in the hoop will be better able to withstand these forces.

In an embodiment, the joining device is arranged to form a continuous seam. Thus, the pipe can be sealed along its length such as to be suitable for transportation of fluids, gasses, liquids or particulate matter. In preferred embodiments, the member has a burst strength of at least 1000 PSI, or at least 2000 PSI, or at least 5000 PSI, which is readily accomplished by suitable choice of materials for the slit tube member and the joining technique.

The member may comprise a thermoplastic and the joining device may be arranged to cause a thermoplastic weld to join together the longitudinal edges of the slit tube. Thus, the heat generated by the joining device causes the thermoplastic material to melt and join together between the edges of the slit tube member in forming the longitudinal seam. Alternatively, the member may comprise an adhesive applied to one or both edges of the member and the joining device is arranged to cause an adhesive bond to join together the longitudinal edges of the slit tube. Thus, the heat causes the adhesive to melt or cure to form the bond between the edges.

In an embodiment, the member comprises a susceptor in the region of the seam and joining device is arranged to provide electromagnetic energy to the susceptor to cause welding of the edges of the member. The susceptor can be provided in either or both longitudinal edges of the member, either within the body of the member, such as a metal foil or particles laminated within the composite structure forming the member, or applied to a surface of the member, such as carbon black painted or a foil layer adhered to a surface.

This susceptor is chosen to be susceptible to the radiation put out by the welding device to rapidly heat and melt the in the vicinity to form the weld, whereas the body of the member passes the radiation with much less heating. Preferably the frequency of the energy is tuned to the susceptor material and the body of the member. For example, in embodiments where the member is a glass fibre reinforced polymer, an infra-red lamp can be used to apply the energy needed to form the weld. The polymer is to a large extent transparent to the IR energy, whereas a metal or carbon susceptor heats rapidly. This can be a metallic foil layer or particles applied to or embedded within the member, or a layer of carbon black painted onto the overlapping seams. Magnetic energy and ferrite particles can be used with microwave energy in a carbon fibre reinforced plastic composite, as the carbon fibre passes the energy whereas the particles heat rapidly.

This provides a workable solution to getting the proper amount of heat to the bondline without overheating the entire structure, and also in achieving intimate contact of the faying surfaces of the two parts at the bondline during heating and cooling despite the normal imperfections in the flatness of composite parts, thermal expansion of the during heating to the softening or melting temperature, flow of the out of the bondline under pressure, and then contraction of the in the bondline during cooling. The weld face can be held closed throughout the welding operation.

In an embodiment, the apparatus comprises a detector downstream of the joining device for testing the join integrity. The detector may be an ultrasound detector or another non-destructive detector. The detector can be arranged to initiate a suitable remedial action when finding an unsound join, such as alerting an operator or initiating a repair of the unsound join.

In an embodiment, the apparatus comprises a control system in communication with the detector and the drive mechanism, the control system being arranged to receive a signal from the detector indicating an unsound join, and in response to back up the drive mechanism such that the portion of tube with the unsound join is passed again past the joining device and the join reformed. Alternatively, the apparatus may comprise a second joining device after the detector arranged to reform the join under the control of the control system if an unsound join is detected, which avoids having to back up the mechanism.

In an embodiment, the apparatus comprises a cooling device downstream of the joining device arranged to cool the seam after it has been joined. This helps bring the join to a stable form more quickly so the pipe can be quickly produced and deployed.

In an embodiment, the drive mechanism is a pinch wheel drive between the spool and the joining device. The pinch wheel grips the extended member and progressively drives it from the spool in an extension direction.

In an embodiment, the apparatus is movable such that apparatus can move as the joined pipe is progressively formed leaving the joined pipe in situ as new portions are uncoiled and joined. The apparatus may be incorporated in a vehicle or trailer having wheels, rollers, tracks, etc., which may be driven or towed. This allows large lengths of tube to be deployed and joined in situ. For example a pipe may be joined and laid in a trench, which is then back filled as the apparatus proceeds. A single coil of the extendible member can potentially deploy a pipe kilometres long.

According to a second aspect of the present invention, there is provided a method of joining a longitudinal seam in a tube, the method comprising:

with a drive mechanism, progressively unspooling a coiled fibre reinforced composite member into an extended form, wherein the member transitions from a flat form when coiled to a slit tube form when extended in which form the member is resiliently biased;

with a joining device positioned downstream of the coil adjacent a portion of the member in its extended form, providing energy to heat that portion and so progressively joining together the edges of the slit tube as the member passes the joining device to form a longitudinal seam in the tube.

The method may comprise testing the join integrity with a detector downstream of the joining device, and in response to detecting an unsound join, backing up the drive mechanism such that the portion of tube with the unsound join is passed again past the joining device and the join reformed.

The method may comprise with a cooling device downstream of the joining device, cooling the seam after it has been joined.

The method may comprise, wherein the drive mechanism and joining device are mounted to a movable vehicle, moving the vehicle as the pipe is progressively joined such that the joined pipe is left in situ as new portions are uncoiled and joined.

According to a third aspect of the present invention, there is provided an apparatus for joining a longitudinal seam in a tube in a borehole, the apparatus comprising:

a spool for holding a coiled member such that an end of the member in an extended form can be fed into a borehole, wherein the member transitions from a flat form when coiled to a slit tube form when extended, in which form the member is resiliently biased;

a device for towing the extended member into the borehole until the member has reached a desired position;

a pig arranged to move through the borehole down the inside of the extended member, wherein the pig has joining means arranged to provide energy to a portion of the member to cause heating so as to progressively join together the edges of the slit tube as the pig passes along the inside of the tube to form a longitudinal seam in the tube.

In an embodiment, the pig is used to tow the extended member into the borehole and is reversible in direction when moving through the borehole down the inside of the extended member.

In an embodiment, the pig comprises means of propulsion for moving through the borehole. The propulsion means may be a traction drive or crawler, which extends through the sides of the pig to contact the surrounding material and develop traction by which the drive can propel the pig through the hole. Alternatively, the pig can be through the borehole.

In an embodiment, the means of propulsion of the pig are reversible.

In an embodiment the apparatus comprises an umbilical cable attached to the pig and drive means for the umbilical cable to propel the pig through the borehole by way of retracting the umbilical cable. The umbilical can carry power and data signals to the pig in addition to towing the pig. The data signals can be used to control the pig, e.g. to manoeuvre the pig to the desired position in the borehole and to communicate the results of join testing to a control device at the head of the borehole.

In an embodiment, the member comprises a susceptor in the region of the seam and welding device in the pig is arranged to provide electromagnetic energy to the susceptor to cause welding of the edges of the member.

In an embodiment, the apparatus comprises a joining device positioned between the reel and the borehole arranged to temporarily join the slit tube member at a reduced diameter compared with the diameter of the slit tube in its resiliently biased form, wherein the pig is arranged to break the temporary joins as it passes along the inside of the tube. Thus, the slit tube member can be towed into the borehole at a reduced diameter, which reduces the friction acting on the member and makes it practical to tow long lengths into the borehole. The pig then breaks the tags, allowing the member to expand to a larger diameter when in the borehole at which diameter it is joined by the pig. Thus, the increased final size of the tube allows a greater through-flow rate in the pipe. The pipe can also be made to expand to the size of the borehole, such that there is no necessity to insert grout between the pipe and the borehole.

The pig can break the temporary joins by mechanical means, or by using heat to melt the joins. Susceptor welding can be used to form the temporary welds. As welding is reversible, the same susceptor can be used for the temporary and the permanent welds. Thus, to form the temporary weld, the slit tube can be constrained, e.g. by passing it through a die or rollers or other guide structure, to assume a reduced diameter, and the susceptor heated at intervals to form tag welds holding the slit tube at this diameter. When the pig travels through the extended member, the welding device heats the susceptor material, causing the tag welds to melt and the slit tube to expand to its final form. As the susceptor continues to be heated, this creates a new weld line between the edges of the slit tube in this expanded form which forms the final welded seam as the seam cools down.

In an embodiment, the temporary join line is along the outer edge of the overlap, keeping the join boundary clean. Thus, the temporary joins do not interfere with the final joined seam and risk weakening the final join.

In an embodiment, the pig has a greater diameter than the diameter of the slit tube in its resiliently biased form such that it expands the slit tube as it passed along the inside of the extended member prior to joining it at the expanded diameter. This technique does not rely on the resilient bias of the slit tube in achieving the expanded form once the temporary joins are broken by the pig, but instead uses the external size of the pig to force the slit tube further open.

In an embodiment, the pig comprises a detector downstream of the joining device for testing the join integrity. As discussed above, an ultrasound detector can be used to find an unsound join and take remedial action, such as reforming the join. In this respect, the pig can be backed up, so the joining device can reheat the seam to cause it to bond. Alternatively, the pig can have a secondary joining device after the detector which can be activated when a faulty join is discovered to locally reheat the seam to cause it to bond.

In an embodiment, a drill string is used to tow the extended member into the borehole and/or the pig is incorporated into a drill string.

According to a fourth aspect of the present invention, there is provided a method of joining a longitudinal seam in a tube in a borehole, the method comprising:

progressively unspooling a coiled member into an extended form in which form the member is resiliently biased and towing the extended member into the borehole until the member has reached a desired position, wherein the member transitions from a flat form when coiled to a slit tube form when extended;

propelling a pig through the borehole down the inside of the extended member; and, progressively joining together the edges of the slit tube with a joining device in the pig by providing energy to heat the member as the pig passes along the inside of the tube to form a longitudinal seam in the tube.

The method may comprise towing the extended member into the borehole with the pig and before reversing the direction of the pig when propelling the pig through the borehole down the inside of the extended member.

The method may comprise using susceptor welding to weld the longitudinal seam in the member.

The method may comprise, towing the member into the borehole at a reduced diameter compared with the diameter of the borehole; and, expanding the diameter of the member with the pig as it progressively moves through the member before joining the longitudinal seam at the expanded diameter.

The method may comprise testing the join integrity with the pig and reforming the join.

In embodiments, the methods described above comprise forming the member into a tube around a drill string and advancing the tube into a borehole as drilling progresses.

Thus the preferred aspects and embodiments allow long lengths of closed section tube to be deployed from a coiled member. The tube is preferably at least 10 m, or at least 100 m, or at least 1000 m, or more long.

In a fifth aspect of the present invention, there is provided a method of repairing a tube in a borehole, the method comprising:

progressively unspooling a coiled member into an extended form in which form the member is resiliently biased and towing the extended member into the borehole until the member has reached a desired position coinciding with the portion of the tube to be repaired, wherein the member transitions from a flat form when coiled to a slit tube form when extended;

propelling a pig through the borehole down the inside of the extended member; and, progressively joining the member to the inside of the tube with a joining device in the pig by providing energy to heat the member as the pig passes along the inside of the tube to provide a lining in the tube to be repaired.

According to a sixth aspect of the present invention, there is provided apparatus for repairing a tube in a borehole, the method comprising:

a spool for holding a coiled member such that an end of the member in an extended form can be fed into a borehole, wherein the member transitions from a flat form when coiled to a slit tube form when extended, in which form the member is resiliently biased;

a device for towing the extended member into the borehole until the member has reached a desired position;

a pig arranged to move through the borehole down the inside of the extended member, wherein the pig has joining means arranged to provide energy to a portion of the member to cause heating so as to progressively join the member to the inside of the tube as the pig passes along the inside of the tube to provide a lining in the tube to be repaired.

Thus, the pig can be used to repair a tube, whether a seamed tube or otherwise, by joining a lining to the inside of the tube using joining. The lining can be thinner than the tube being repaired to avoid reducing the bore excessively and can cover the entire length of the tube or just a damaged portion. Using the principles described herein, the liner can be tag joined at a reduced diameter when being towed into position, and then expanded by the pig by breaking the tag joins and using the diameter of the pig or the resilient bias of the liner in its extended form to come up to the desired diameter, which preferably fits closely to the interior bore of the damaged pipe. Welding or adhesive may be used to join the liner to the tube to be repaired. Preferably susceptor heating is used to join the liner in place, using a susceptor that extends throughout the width of the member so as to weld the liner to the pipe through a full 360 degrees, either by welding or by an adhesive applied to the outer surface of the split tube. A test system in the pig, such as ultrasound detector, can detect whether or not the liner has been successfully joined in place.

According to a seventh aspect of the present invention, there is provided a pig for carrying out joining in tubes, the pig comprising:

propulsion means for moving through the inside of a tube;

joining means for providing energy to a portion of the member to cause heating so as to progressively join the tube as the pig travels through the tube.

It will be appreciated that any features expressed herein as being provided "in one example" or "in an embodiment" or as being "preferable" may be provided in combination with any one or more other such features together with any one or more of the aspects of the present invention. In particular, the extendible member, joining techniques and join testing system described in relation to one aspect may generally be applicable to the others.

BRIEF DESCRIPTION OF THE DRAWINGS

Embodiments of the present invention will now be described by way of example with reference to the accompanying drawings, in which.

DETAILED DESCRIPTION

Figure 1:
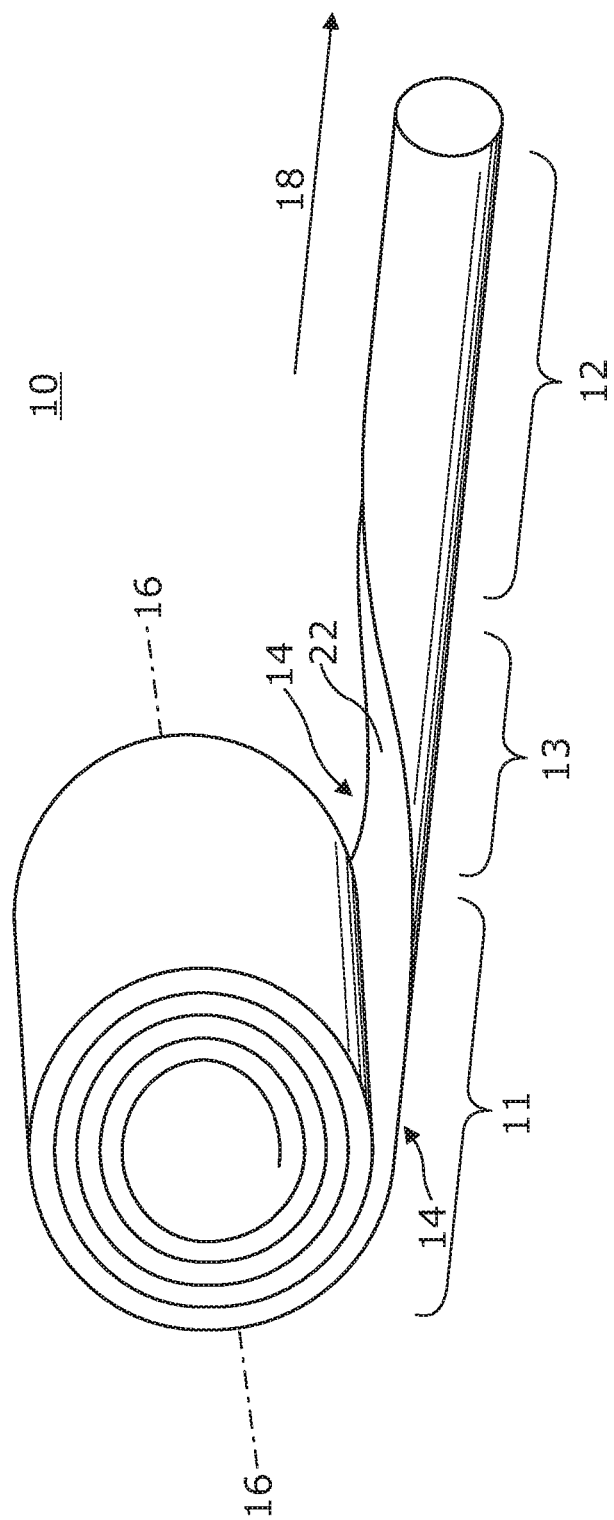
FIG. 1 shows an example of an extendible member suitable for use with embodiments of the present invention.

FIG. 1 shows an example of extendible member 10 suitable for use with the various embodiments of the present invention in forming a tube by longitudinally joining the edges of the member. The member 10 can be reconfigured between a coiled state 11 and an extended state 12, via a transition stage 13. In the extended state 12 the member is generally elongated and biased to have a curved or non-linear cross section in a direction transverse to the longitudinal axis 18 of the member. (References to longitudinal axis or longitudinal extent or direction of extension in this document generally refer to this axis 18). This curvature can be adapted and thus the cross section of the extended portion can comprise anything from a closed or substantially closed circular shape, or other generally closed shapes. The member 10 is resiliently biased in this curved cross section when extended. This gives structural rigidity to the member 10 when extended. In the coiled state 11 the member 10 is generally opened out at the side edges 14 to have a flat cross section, and is coiled around an axis 16 that is transverse to the longitudinal axis 18 of the member 10. The member 10 is thin in cross section to aid coiling, e.g. typically between 0.5 mm and 5 mm for most applications. Such members are sometimes referred to as STEMs (slit tubular extendable members).

The member 10 can be made from various materials suitable for transitioning between a flat, coiled form and an extended, slit tube form, and being resiliently biased in the slit tube form. In general, plastics are contemplated as being suitable materials, although others are possible. The materials may furthermore be selected in accordance with the joining technique used to joining the edges 14.

In the present example, the member 10 comprises a thermoplastic such that the edges 14 of the slit tube can be welded together using thermoplastic welding techniques, as described below. In the present example, the member 10 comprises a composite material having a thermoplastic matrix with fibre reinforcements, such as a fibre reinforced polymer ("FRP" hereafter). The fibres may be glass, carbon, or aramid, while the polymer may be polypropylene, polyethylene, a polyamide, polyester thermoplastic, poly-ether-ether-ketone or any other polymer suited to the particular requirements of the task at hand. The composite material may comprise a single layer or plural layers with fibres oriented in different directions in each lamina. The use of fibrous materials mechanically enhances the strength and elasticity of the plastic matrix. The extent that strength and elasticity are enhanced in a fibre reinforced plastic depends on the mechanical properties of both the fibre and the matrix, their volume relative to one another, and the fibre length and orientation within the matrix. FRPs are widely used in many areas such as aerospace and automotive industries, and are not described in detail herein.

In the present example, the member 10 is a bistable reelable composite (BRC). Such a bistable member has a first stable state in the coiled form 11, where the cross section of the member 10 is generally flat and a second stable state in the extended form 12, where the cross section of the member is curved as previously described. The bistable member 10 may be capable of reversible configuration between its coiled and extended forms a plurality of times. Suitable structures are disclosed in the following international patent applications, each of which is incorporated here by reference: WO A 88/08620, WO-A-97/35706, WO-A-99/62811, and WO-A-99/62812. Such bistable structures are available from RolaTube Technology Limited of Lymington, the United Kingdom.

In general, there are two ways to make a tube bistable; either by altering the bending stiffnesses of the structure so that it is no longer isotropic, for instance by using a fibre-reinforced composite, or by setting up an initial pre-stress in the structure. The BRC in the present example uses the first technique. This involves arranging the fibres to increase the torsional stiffness, and increase the coupling between bending in the longitudinal and transverse directions. This can be achieved by ensuring that in the surface layers of the BRC, i.e. those offset from the midplane of the BRC, stiff fibres are angled relative to the longitudinal axis, e.g. at ±45°. A simple example is the anti-symmetric [+45°/−45°/0°/+45°/−45°] fibre lay-up.

In engineering terms these surface layers have high Poisson's ratios. It is well known that as a curved shell is straightened the inner surface gets longer and the outer surface gets shorter. Thus, when a section of the extended tube is opened, as the initial curvature straightens, the surface fibres are deformed which, due to their high Poisson's ratio, exert a force acting to curve the opened section longitudinally into its coiled form. The tube coils with same sense curvature, i.e. the centre of curvature is on the same side of the structure in both forms.

Normally when something is bent the amount of energy stored by that bending (the total strain energy) rises as the degree of bending increases. In BRCs, once the initial curvature is straightened as the tube is opened, the stiffness along the longitudinal axis drops and the forces acting on the material of the tube arising by the deformed surface fibres can act to flip it into the coiled form. As this second curves forms, the total strain energy drops, thereby forming a second stable form for this section.

These principle operate in reverse when moving from the coiled state to the extended state.

Thus, structural members are formed that exhibit a stable geometry in both the extended and coiled states. These manage the problems of difficult handling and complicated mechanisms by forming STEM type structures from materials that have been engineered so as to make them easy to coil and handle.

There now follows a description of various techniques for forming tubes from these extendible members. To this end, the extendible member 10 can have any desired diameter, length, thickness, composition and material properties according to the desired properties of the tube being formed given its intended application.

As will be described below, the slit tube member 10 may have a susceptor 22 in the region of one or both longitudinal edges 14 of the member 10 as part of the welding process. However, it will be appreciated that other welding processes that do not use susceptors are known and may be substituted in the following description.

Figure 2:
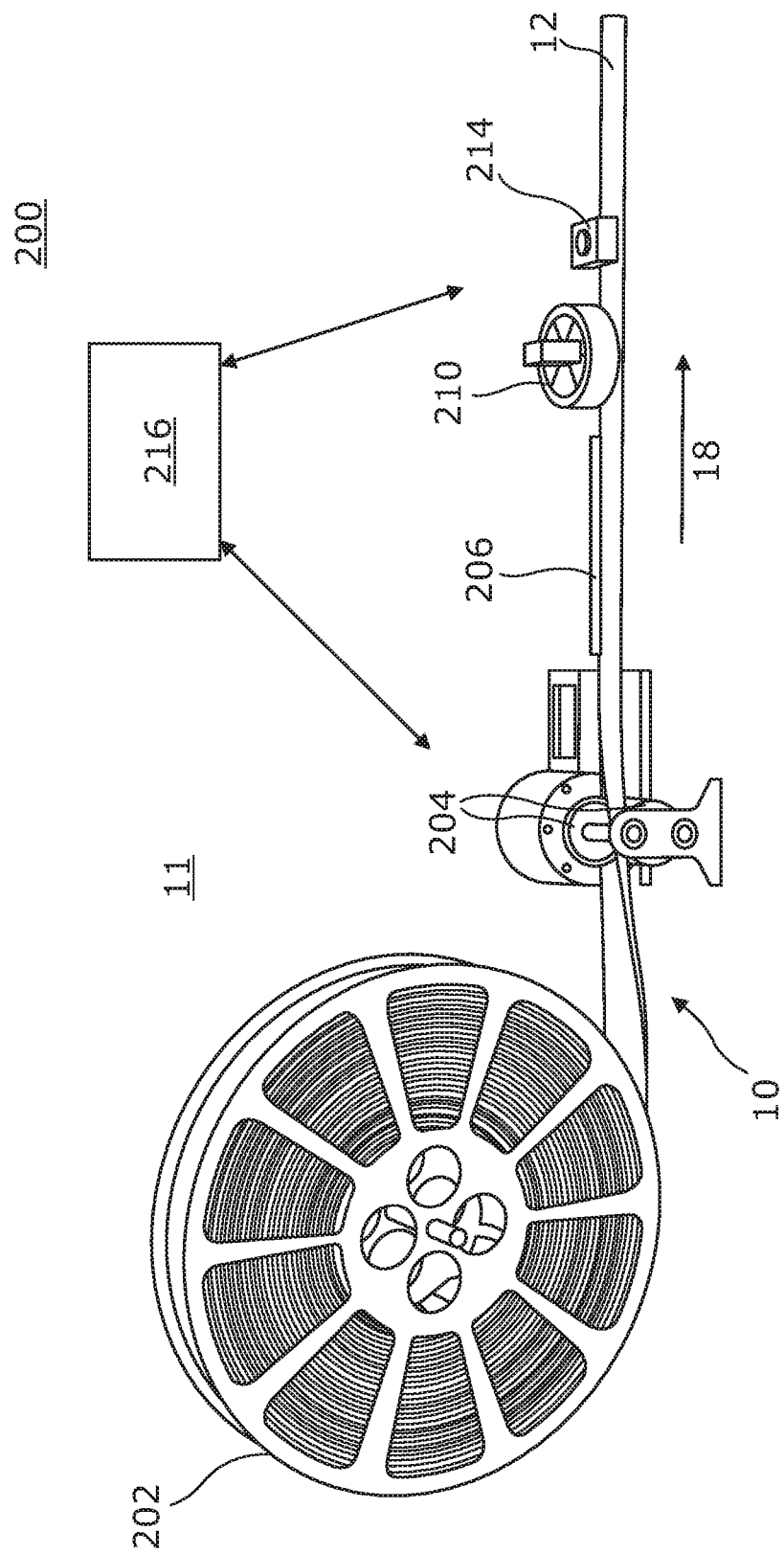
FIGS. 2 and 3 show an example of apparatus for deploying a pipe according to an embodiment of the present invention.
Figure 3:
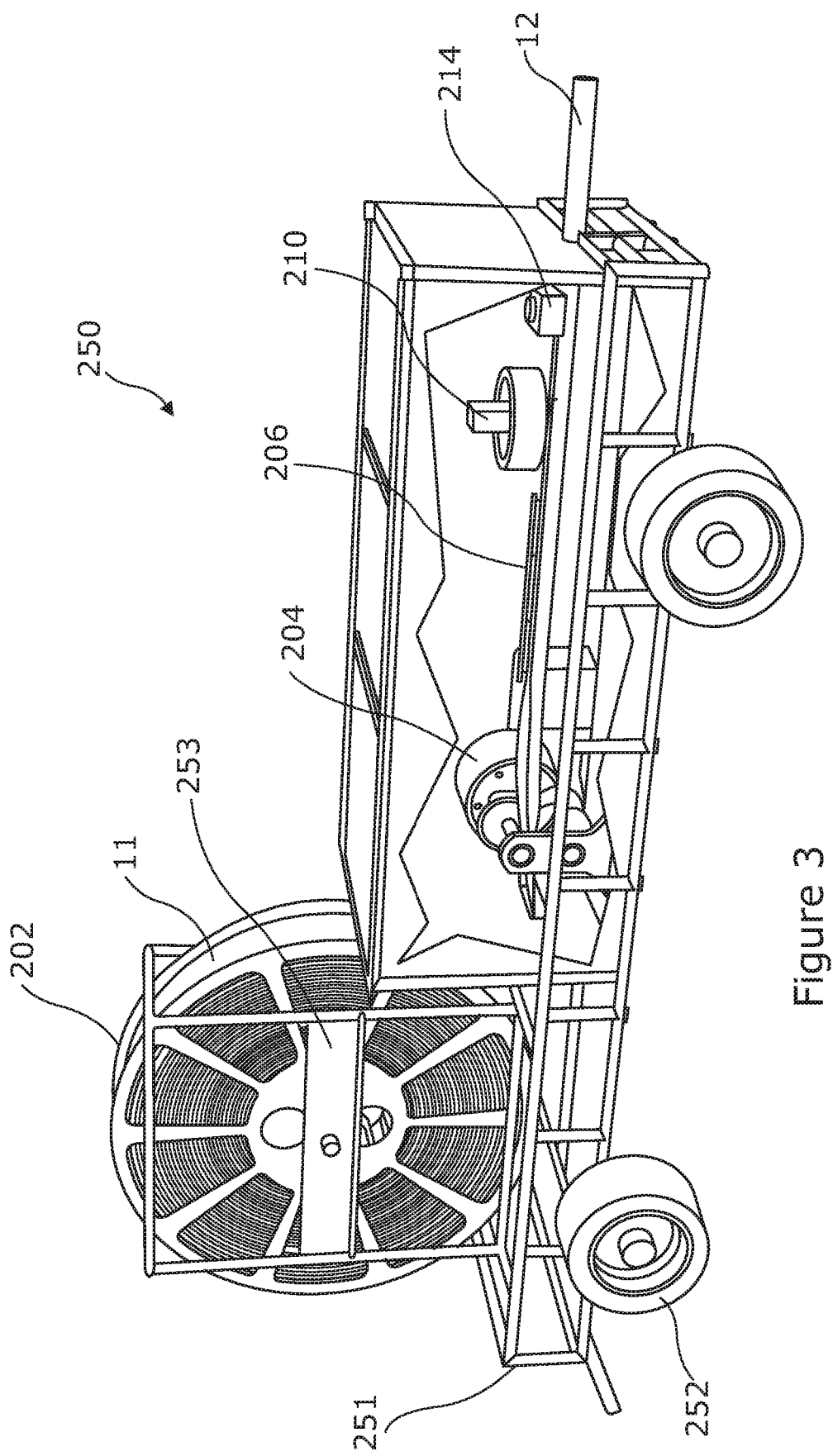

FIGS. 2 and 3 show an apparatus 200 for joining longitudinal seams in an extendible coiled member such as that shown in FIG. 1 to form a sealed tube, pipe or other sections. FIG. 2 show the elements of the apparatus 200 separately from any support structure. In practice, these would be fixed to a support structure of some form, whether stationary or mobile such as the vehicle shown in FIG. 3.

The apparatus 200 comprises a spool 202 on which the coiled part 11 of the member 10 is wound. An end 12 of the member 10 extends from the coil and is passed through a pinch wheel drive 204 which progressively drives the member 10 from the spool 202 in an extension direction 18. The drive 204 contacts the member in the transition portion 13 as it transitions from the flat form 11 when it is coiled to the curved form 12 when it is extended and in which it is resiliently biased.

When it has assumed its curved, extended form, the member is passes by a joining device 206. As shown by the cross section of FIG. 4, in its extended form, the side edges 14 of the member overlap and contact each other. The joining device 206 provides energy 24 to the member in the region of the overlapping edges 14 to heat the region and create a join seam 20 longitudinally along the member. A cooling device 210, such as a fan is provided downstream of the joining device 206 to help cool the molten material in the weld region to speed up the formation of the join.

In the present example, the joining device 206 is a welding device or welding head 206 which creates a longitudinal weld along the thermoplastic member. Thermoplastic welding is a process for forming a fusion bond between two faying surfaces on two faces of one or more thermoplastic parts. A fusion bond is created when the thermoplastic on the surfaces is heated to the melting or softening point and the two surfaces are brought into contact, so that the molten thermoplastic mixes, and the surfaces are held in contact long enough so that the thermoplastic cools below the softening temperature There are many different techniques for welding thermoplastics, some of which have been commercially available for many years for joining composite structures in for example the aerospace, marine and automotive industries. These include manual processes such as hot gas welding and extrusion welding, processes using vibration and frictional heating between the materials such as ultrasonic and linear vibration welding and processes using an electromagnetic heat source such as resistive implant welding, dielectric welding and laser welding. Any of these techniques can be used to join the longitudinal seam in the tube.

In the present example, the technique used for welding the thermoplastic is so-called "susceptor welding". The member 10 has a strip or layer of susceptor 22 running down one or both edges 14. Thus, in extended slit tube form of the member, with the edges 14 abutting or overlapping in the position they are to be welded together, the susceptor 22 lies in the interstices of the weld line where the edges 14 are to be joined. The susceptor" will heat in the presence of some form of energy, supplied by the welding device 206, that the material to be welded is substantially transparent to. Thus, heat is got to the weld line between the edges 14 of the slit tube. The heat generated melts or softens the thermoplastic in the region of the susceptor for fusion of the facing surfaces of the slit tube edges to be joined.

Some examples of susceptors and the energy sources that can heat the susceptors are as follows:
- Some ferrite and ferro-magnetic materials can be heated by an oscillating magnetic field
- Some ferrite, metallic—such as iron filings—and other materials will heat in a microwave field
- A source of infra-red radiation can be tuned such as to minimise absorption by the material of the pipe to be welded whilst putting a material that is highly absorbent of the same frequencies into the weld boundary, such as carbon black
- Lasers can be used as an alternative to tuned infra-red sources, with an absorbent die-stuff in the weld boundary. This technique is generally referred to as "laser clear die".

In general terms, many materials heat up in an RF field, whilst the polymers and reinforcing fibres used for this type of fibre reinforced coilable pipe do not.

The advantage of these techniques as a body is that the weld face can be held closed throughout the welding operation.

Optionally, the apparatus 200 includes a non-destructive testing system 214 downstream of the welding device which tests the integrity of the join. An example of a suitable testing system 214 is an ultrasound test system. Such devices are known in general in the field of composite manufacture for inspecting parts for flaws based on the propagation of ultrasonic waves in the object or material tested. Briefly, in typical applications, very short ultrasonic pulse-waves with centre frequencies ranging from 0.1-15 MHz, and occasionally up to 50 MHz, are transmitted into materials to detect internal flaws or to characterize materials. In reflection (or pulse-echo) mode, the transducer performs both the sending and the receiving of the pulsed waves as the "sound" is reflected back to the device. Reflected ultrasound comes from an interface in its path, such as a wall of the object or from an imperfection within the object. This produces a signal with an amplitude representing the intensity of the reflection and the distance, representing the arrival time of the reflection. The testing system 214 can be calibrated by experimentation to detect an unsound weld for the particular type of pipe (its thickness, materials, joining technique, etc.), e.g. by looking for signals of a particular range of amplitudes at a particular range of depths.

The testing system 214 can be linked to a control system 216 which receives a signal from the testing system 214 indicative of an unsound weld being detected. The control system 216 in response can cause the apparatus to reverse the direction of travel of the pipe by controlling the drive 204 so that the portion of pipe containing the faulty weld is again passed under the welding device 206. The control system 216 can cause the apparatus to move the affected area more slowly past the welding device 206 to increase the likelihood of making a sound weld at the second pass. The procedure can be repeated until it is determined that a sound weld is produced, optionally up to a predetermined number of attempts.

Alternatively, a second joining device (not shown) can be provided downstream of the testing device 214 which can be activated by the control system 216 in the event of a unsound join being detected to again heat the material in the locality of the fault and re-join the seam. This avoids reversing the direction of travel of the member 10.

Alternatively or additionally, the testing system 214 can alert an operator to the presence of a detected unsound join, enabling the operator to take an appropriate measure in response, such as carrying out further testing to confirm the unsound join and/or taking remedial action to correct the fault. The testing system 216 can log the position at which the unsound join is detected to be supplied to the operator, for example using position data generated by a sensor in the spool 202 or drive 204 to track the current position along the coiled member 10.

FIG. 3 shows the apparatus 200 incorporated into a vehicle 250 comprising a platform 251 on wheels 252 on which is mounted supporting structure 253 and/or a housing for supporting and housing the elements of the apparatus shown in FIG. 2 and holding them in fixed relative position.

Thus, the apparatus 200 is movable, enabling long sections of pipe to be laid in situ. This lends itself well to being fitted to a trailer or where the seal is needed to be in place immediately. Pipe can be laid over large distances, such as in trenches that can be backfilled as the vehicle advances. This compares favourably with prior art techniques of transporting individual sections of pipe to the installation location and joining them end to end.

In the example of FIGS. 2 and 3, thermoplastic welding is used to join the longitudinal edges of the slit tube member 10. However, other joining techniques can be used employing adhesive bonding to join the tube. In these examples, the joining device supplies heat to the adhesive to progressively form the join, such as heating of a hot-melt adhesive or curing of a thermosetting adhesive.

In the case of hot melt adhesives the process is the same as for welding except that the adhesive is melted, not the base polymer of the member. In the case of a thermosetting adhesive these are generally "tar-like" in consistency although some are films that first turn liquid as the heat is applied, then go through a curing process.

The adhesive can be applied as a film to the edge or edges of the member 10. This would make the member easy to handle. However, the adhesive could be applied as a separate film or by coating the bond face as the pipe is extended, or by applying it via the pig (in the examples described below).

Optionally, the spool 202 can be driven directly to extend the member 10 rather than using the pinch wheel drive 204. Alternatively, the extended end of the member 12 can be tethered as the vehicle 250 moves away, extending the member behind it.

Optionally a guide means (not shown) is positioned downstream of the drive 204 to help guide the edges of the member 10 to assume the abutting or overlapping form in which the seam 20 is to be welded. In embodiments, the form of the slit tube member 10 in which it is welded is not identical with the form in which it is resiliently biased. For instance, in its biased form, the member 10 can form a slit tube with a small separation between the longitudinal edges 14. A guide member can the provide an external force to move the edges 14 of the slit tube together into the desired abutting or overlapping position for welding, and/or supply a force to press the edges together during welding to help for the weld. A die or rollers are suitable for providing the guide member. Once, the tube 10 is welded, the biasing force can be removed. This can create a residual hoop stress in the welded tube 10, which can be useful in some cases. However, in these embodiments, it is preferred that the resilient bias of the member 10 in its extended form provides most of the curvature needed to form the closed section tube, e.g. the slit tube in its resiliently biased form subtends an angle of at least 270 degrees, or at least 360 degrees, in order to simplify the function of the guide member in positioning the edges of the member in the position in which they are to be welded together.

Thus, the apparatus 200 "extrudes" the pipe—taking a roll of material, preferably Bistable Reeled Composite, transporting it past a welding head with suitable control system and then, for preference, carries out a non-destructive test of the welded pipe as it goes and allows a fault to be reversed and re-welded. It is contemplated that the apparatus can produce welded pipes are rates of between 0.5 m to 10 m per minute.

Figure 5:
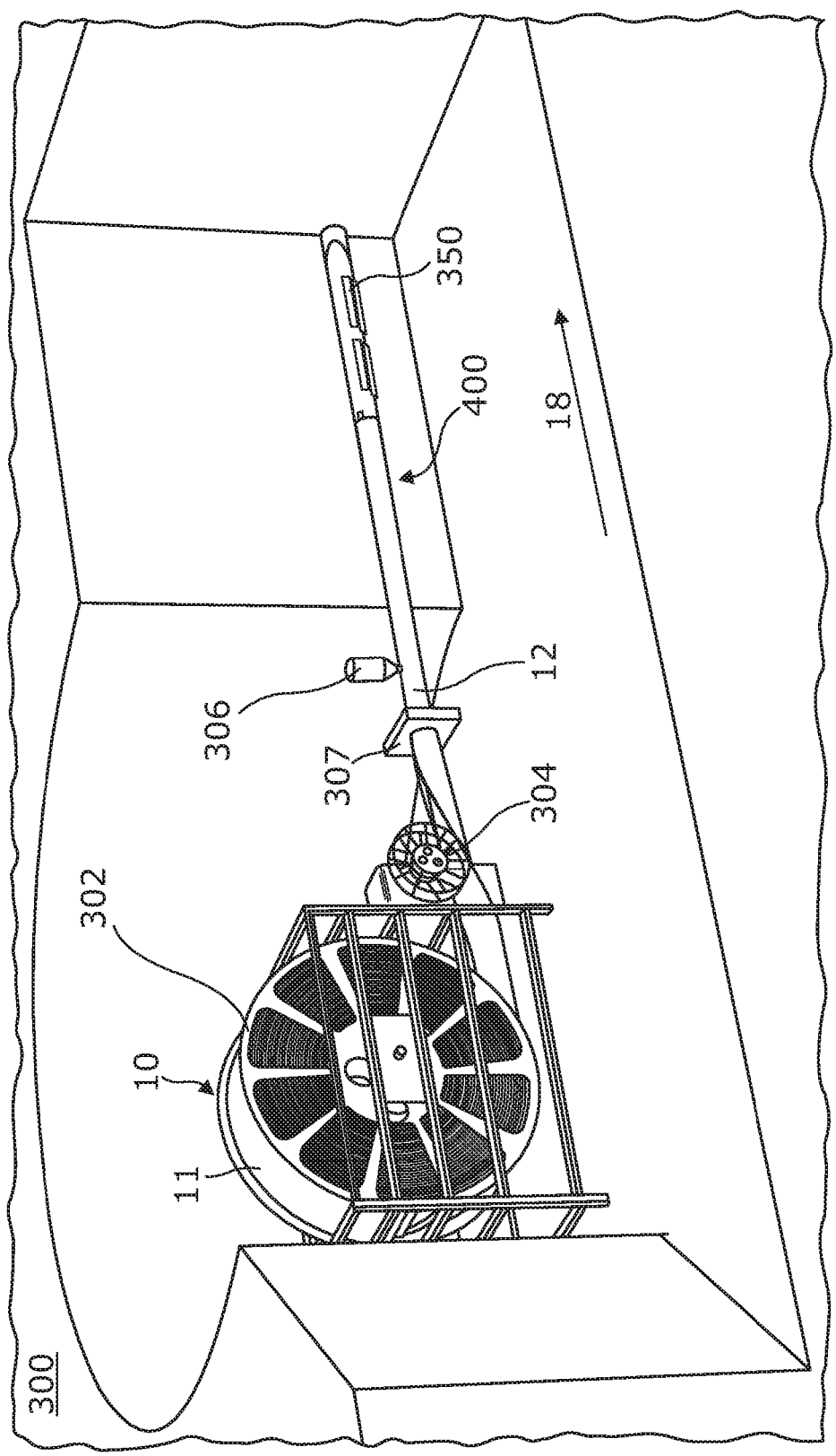
FIGS. 5 and 6 show an example of apparatus for deploying a pipe according to another embodiment of the present invention.
Figure 6:
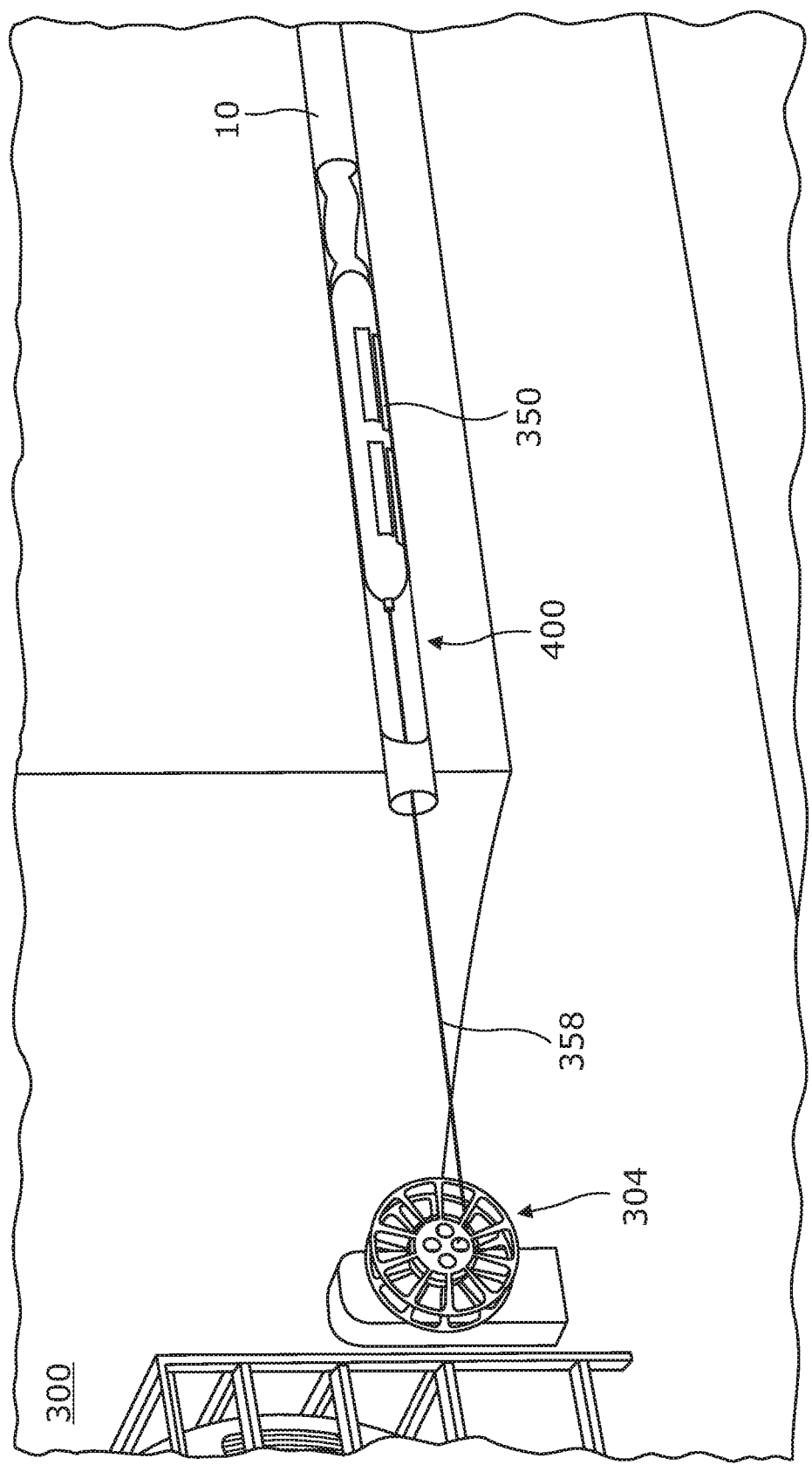

FIGS. 5 and 6 show another example of an apparatus 300 for forming pipes from an extendible coiled member 10 such as that shown in FIG. 1.

The apparatus 300 comprises a spool 302 on which the member 10 is initially coiled 11 and from which an end can be extended. The extended end 12 of the member 10 is attached to a "pig" 350 which tows the member 10 into a borehole 400 causing the member 10 to uncoil from the spool 302 in an extension direction 18.

"Pigs" are devices known generally in the oil and gas exploration and extraction industries for moving through a pipeline for inspecting and cleaning the pipeline. Often these move with the flow of fluid within a pipeline, although self-powered pigs are known. As used herein, the term "pig" is intended to mean any device constructed and arranged to move within a borehole or pipe or similar.

Figure 8:
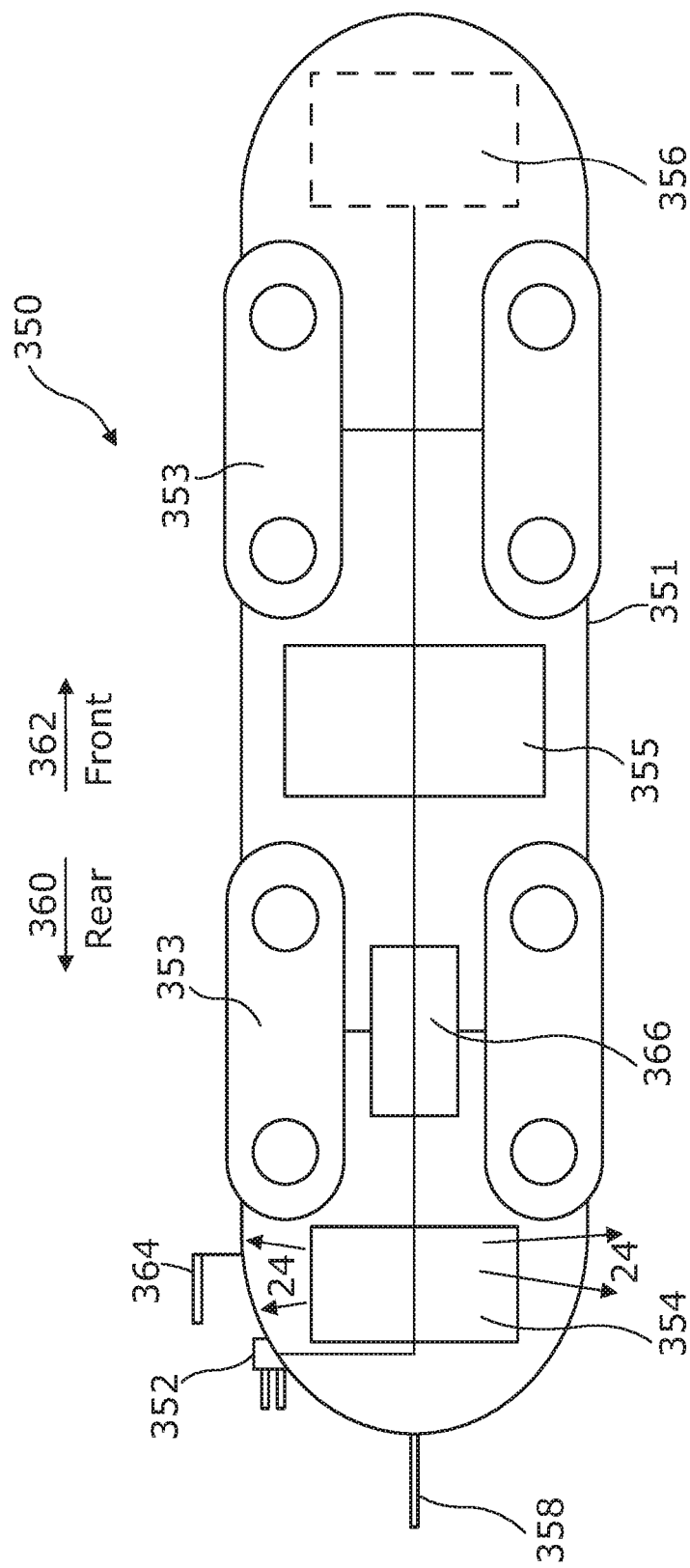
FIG. 8 shows schematically part of the apparatus of FIGS. 5 and 6.

As shown by FIG. 8, the pig 350 comprises a body 351 on which is mounted a controllable gripping device 352 for attaching to the member 10 so as to be able to grip the member 10 while it is towed to the desired position and then release the member 10. The pig 350 also includes tractor drives 353, which extend through the sides of the body 351 to contact the borehole 400 or surrounding structure, to propel the pig through the borehole 400. The pig 350 has a first joining device 354 at its rear 360 (relative to the direction it travels when towing the member 10) and preferably a join testing device 355, such as an ultrasound detector as described above. Optionally the pig 350 has a second joining device 356 at the front 362. In this example, the joining device (or devices) are welding device(s) to provide thermoplastic welds in the thermoplastic member. However, as will be appreciated, other joining techniques such as adhesive bonding can be used as in the examples of FIGS. 2 and 3.

The pig 350 may have an umbilical 358 attached at its rear 360 which can be used to provide power and or data signals to the pig 350, or carry drill tailings or provide any other service that may be required. The umbilical 358 can be wound on a drum 304 positioned at the entrance to the borehole 400 and used to tow the pig back out of the borehole 400. Thus umbilical 358 is mounted in front of the spool 302 on which the member 10 is wound and extends through the insides of the member to attach to the pig 350.

Figure 7:
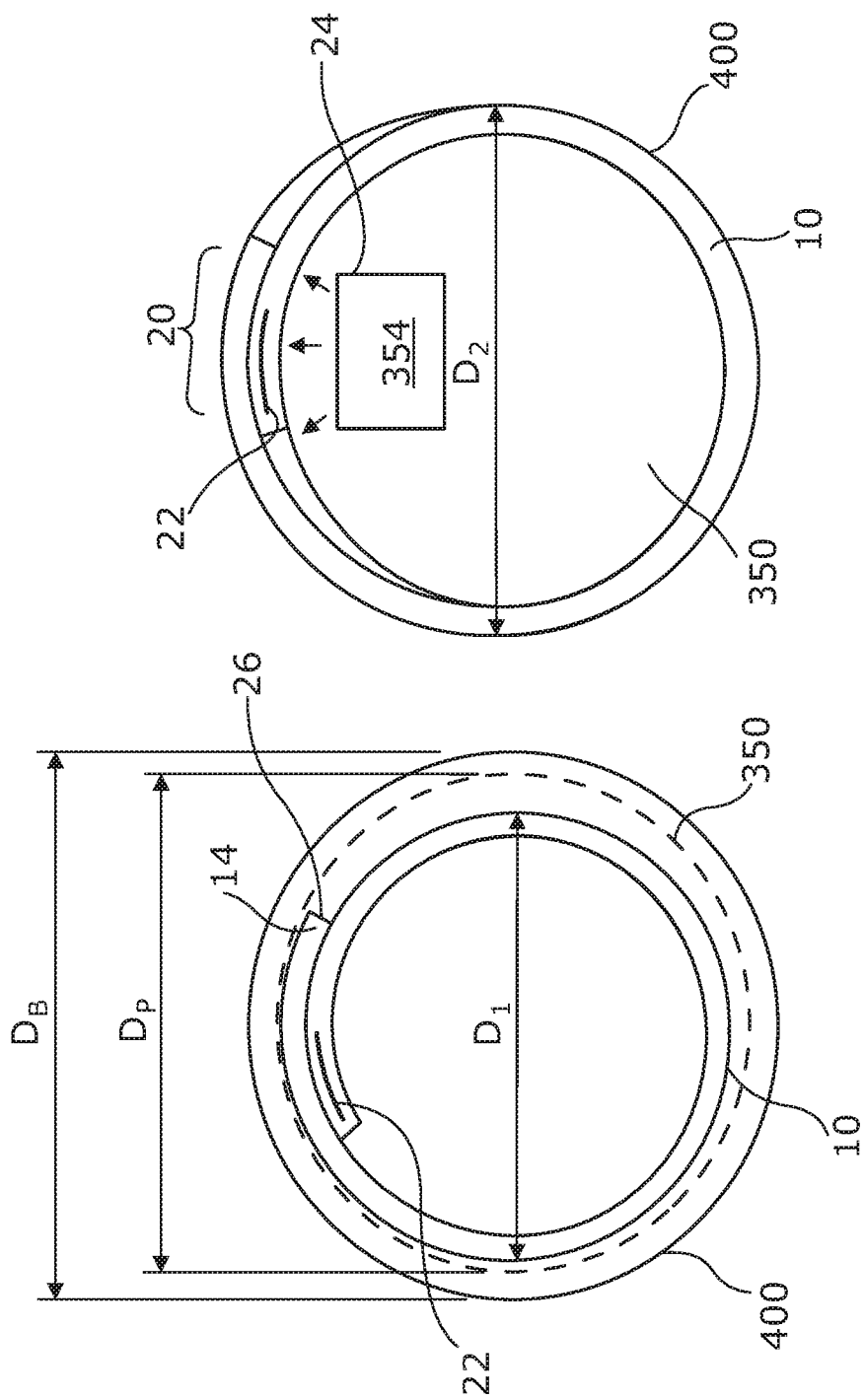
FIG. 7 shows in cross section an example of a seam being formed by the apparatus of FIGS. 5 and 6.

As the member 10 is extended from the spool 302, it transitions from the flat form 11 when it is coiled to the slit tube form 12 when it is extended and in which it is resiliently biased. Preferably a temporary join forming device 306 is arranged to join the edges 14 of the slit tube together with temporary joins 26 before entering the borehole 400. In this example, the temporary join forming device is a tag welding head arranged to weld temporary tag welds along the tube, although it will be appreciated that other temporary join forming techniques can be used. Preferably the diameter of the tube when the temporary welds are formed is at a reduced diameter to the intended diameter of the pipe when installed. A guide means 307, such as a die or rollers, can help form the pipe to the preferred diameter to be tag welded. Susceptor welding at the seam can be used as in the previous example to weld the pipe, or some other form of welding. Tag welds are preferably used, rather than continuous welds, as these are welds are temporary and are intended to be broken, as described below, and so need not be as strong as the final welds. The reduced diameter makes towing the tube 10 into the borehole 400 easier due to the reduced friction, and allows longer lengths of pipe to be laid. FIG. 7A shows the outer diameter of the tube $D_1$ in its constrained form, which is significantly smaller than the diameter of the bore hole $D_B$. FIG. 7A also shows in outline the diameter of the pig for comparison $D_P$.

When the pipe 10 has been towed to the desired installation position in the borehole 400 by the pig 350, the pig 350 is reversed back out of the borehole 400 the way it came, as shown by FIG. 6, by rewinding the umbilical 358 on the drum 304.

Alternatively, the tractor 352 can provide propulsion to the pig 350 in either or both directions, or the pig 350 can be towed in either or both directions. Other means of propulsion can be used.

As the pig 350 is reversed back out of the borehole 400, it now travels down the inside of the member 10. As it progresses, the pig 350 breaks the temporary tag welds 26 as it goes. The pig 350 may have a blade 364 or similar member mounted on its body 351 arranged to pass between the edges 14 of the tube and mechanically break the welds 26. Alternatively or additionally, where the tag welds 26 are thermoplastic welds, because thermoplastic welding is a reversible process, the welding device 354 or another welding device in the pig 350 can provide energy 24 to melt the bonds 26 comprising the temporary tags 26.

As the tags 26 are progressively broken, the pipe 10 expands to its full diameter $D_1$, which preferably is close to the diameter of the borehole $D_B$, as shown in FIG. 7B. The expansion may be caused by the slit tube member 10 resuming its the resiliently biased form when the constraint of the tags 26 is removed. Alternatively or additionally, the pig 350 can cause the slit tube to expand as it passes through the inside of the slit tube 10 by way of its external diameter being larger $D_P$ than the constrained diameter of the slit tube $D_1$.

Once in its expanded form, the edges 14 of the slit tube member 10 overlap or abut in the position in which they are to be joined together. As the pig 350 progresses along the slit tube, the welding device 354 emits energy 24 causing the susceptor in the region of the edges to rapidly heat, thus melting the thermoplastic in that area and causing the edges 14 to be welded together. When cooled, this creates a welded seam 20 longitudinally along the member 10. A cooling device, such as a fan, may be provided downstream of the welding device 354 to help cool the molten material in the weld region to speed up the formation of the weld.

The pig 350 has a non-destructive weld testing device 355, such as an ultrasound detector. If an unsound weld it detected, as in the apparatus 200, the weld can be reformed or the position logged for remedial action later. When reforming the weld, the pig 350 can be reversed so that the welding head 354 again welds the join. Alternatively, to avoid backing up the pig 350, the pig can use a secondary welding head 356 that can be activated to reheat the section of pipe 10 where the unsound weld was detected to remelt the thermoplastic and remake the weld. Again, these processes may be repeated until a sound weld is detected, or it is determined to give up after a predetermined number of attempts.

In some embodiments, the same weld head 354 is used to break the temporary tags 26 and to form the permanent seam 20. Alternatively, different weld heads can be employed. It is possibly to use different welding techniques for the temporary tags and the permanent seals. For instance, different susceptors 22 can be used to form the temporary tags 26, compared to the permanent seals 20 and the pig 350 can have weld heads differently tuned to each susceptor so the pig 350 can control separately how the de-welding of the tags and welding of the seam occurs. For instance, magnetic energy from a first welding device can be used to break the tags 26, and microwave energy from a second welding device can be used to weld the seam 20 by using different susceptors tuned to those sources of energy.

It will be appreciated, that tag welds 26 are preferred as being sufficient to temporarily hold the tube in its reduced diameter form whilst it is towed to position in the borehole 400, but a continuous temporary weld could be used.

The tag welds 26 may consist of a line weld along the outer edge of the overlapping edges 14 away from the permanent weld boundary, as shown in FIG. 7A. This leaves the weld face 20 for the permanent weld "clean" to improve the quality of the weld.

The weld heads 254,256 and ultrasound testing device 355 may be designed to emit energy through 360 degrees of angular position. In this way, all of the tube 10 will be exposed to the energy, thereby assuring that seam area 20 will be exposed. Alternatively one or both may focus the energy specifically on the area of the overlapping edges 14. To achieve this, it may be necessary to provide the pig 350 with some way of rotationally orientating itself relative to the pipe 10 and the edges forming the seam 20. This may be accomplished by gyroscopic means for instance to establish the angular position of the pig 350 relative to the borehole 400 in cases where the pipe 10 has a fixed angular position relative to the borehole 400. Alternatively, mechanical means may be used to keep the pig 350 at a constant angular position relative to the seam 20 and so align the welding head 354 and/or ultrasound detector 355 with the seam 20, e.g. the interaction of the blade 360 or another member with the seam 20 can be used to maintain a constant the rotational position of the pig 350 with respect to the seam 20. Alternatively the pig 350 may have an electronic sensor for detecting some reference in the tube 10. For example, where the susceptor 22 is a foil layer or other metallic susceptor, an electromagnetic detector can be used to determine the position of the susceptor 22, to provide a reference by which the pig 350 can alter its rotational position and so align the welding head 354 and/or ultrasound detector 355 with the seam 20.

The pig 350 preferably has a control system 366 which controls the propulsion of the pig via tractors 353 or tow lines 358, the welding devices 354,356, the gripper 352 and the weld testing device 355 and generally controls the functionality of the pig described herein. Alternatively the pig 350 can be controlled remotely via signals sent and received via the umbilical 358.

The apparatus 300 is useful for deployment in lining blind boreholes or where access is only feasible from one end. In this case, the pig 350 tows the slit tube member 10 into position in the borehole 400, before welding the longitudinal seam 20 on its return trip.

However the pig 350 can be used in boreholes 400 where access is available from both ends. In this case the pig 350 can alternatively be towed through the borehole from the far end rather than relying on internal propulsion. Alternatively, the reduced diameter tube can be towed in without using a pig, and the pig 350 introduced at either end to perform the welding as it passes through the tube. Different pigs 350 may be used for the towing and the welding operations.

If a faulty weld is detected by the pig 350, an alternative repair procedure can be carried out compared with techniques described above of trying to re-weld the unsound weld. Instead, a repair can be made by welding a thermoplastic liner over the interior walls of the pipe at the site of the faulty weld to seal the tube. The liner is towed to the position of the bad weld and welded in place by the pig 350, using the techniques described above. The liner preferably has a susceptor or susceptors that extend around the circumference of the sleeve (in comparison with the member 10 described above where the susceptor is preferably localised at the seam) such that the entire liner is heated by the welding device in the pig and welded to the inside surface of the pipe containing the faulty weld. The sleeve can be significantly thinner than the original pipe being repaired as it is largely supported by the original pipe and is subjected to less bursting stress as a result. The sleeve can be applied to all of the length of the pipe, or just a section where the faulty weld occurs. This technique can also be used to repair other pipes where it has been determined that a leak, damage or corrosion has occurred.

Figure 9:
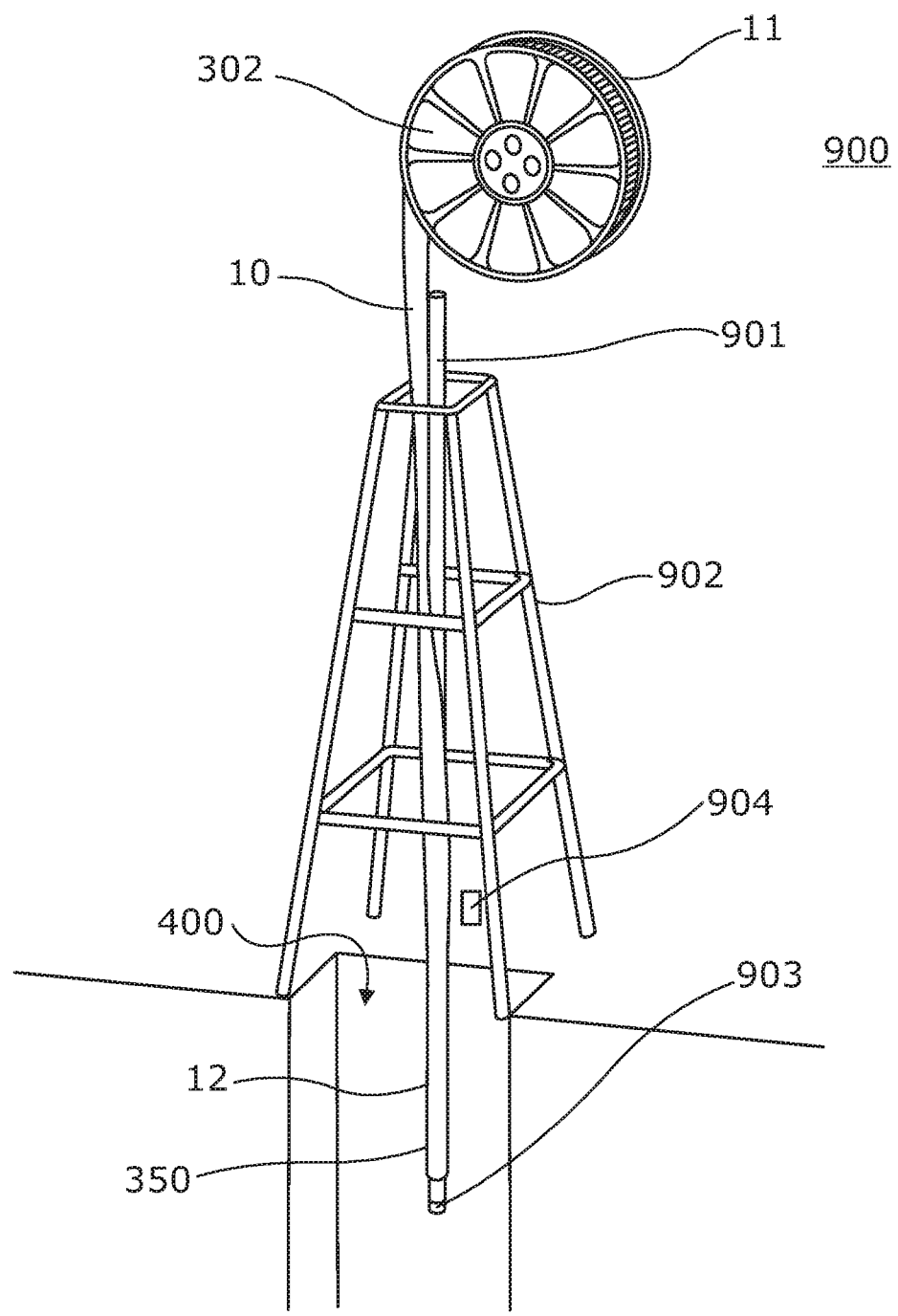
FIG. 9 shows an example of casing a borehole while drilling according to an embodiment of the present invention.

The techniques disclosed herein lend themselves well to "casing whilst drilling". An example of this scenario is shown by FIG. 9 in which a borehole is being made by apparatus 900 including a drill head 903 at the end of a drill string 901 suspended by a drilling rig 902 at the surface.

Casing while drilling may employ the techniques described in relation to FIGS. 5 to 8. The reel 302 of coiled member 10 to be used as the casing material is positioned generally above the drill string 901 and drill rig 902. The extended end 12 of the member 10 is attached to the drill head 903. As the borehole 400 is progressively drilled by the drill head 903, the member 10 is extended from the reel 302 and wraps around the drill string 902 and is (optionally) temporarily welded to a reduced diameter by welding head 904 and advances with the drill head 903. The drill string 902 passes and (where applicable to the drilling technology) rotates within the centre of the reduced diameter member 10. The smaller diameter of the tag welded pipe makes it easier to pull or push the pipe through a borehole 400. When the borehole 400 is has been formed to the desired depth, the drill string can be withdrawn through the centre of the reduced diameter pipe. The drill head 903 may be smaller than the reduced diameter tube such that it can be withdrawn through the centre of the tube (it being understood that drill heads are typically configured to bore a hole larger than their diameter such that the drill head can bore a hole large enough for the reduced diameter tube to be advanced whilst still being capable of being withdrawn through the centre of the tube). The pig 350 can then be lowered into the pipe in the borehole and towed back to the surface, expanding the pipe by breaking the temporary welds and welding the permanent longitudinal seam as it is withdrawn (following the principles described above in relation to FIGS. 5 to 7) Thus, the casing is made to expand to fit tight within the borehole 400.

In other embodiments, the pig can be incorporated into the drill string 902 itself, e.g. adjacent the drill head. Thus, when the drill string is withdrawn, the temporary welds are broken and the permanent welds formed as the drill head is withdrawn. Thus, the pig does not need its own source of locomotion, as it is moved with and as part of the drill string.

Figure 4:
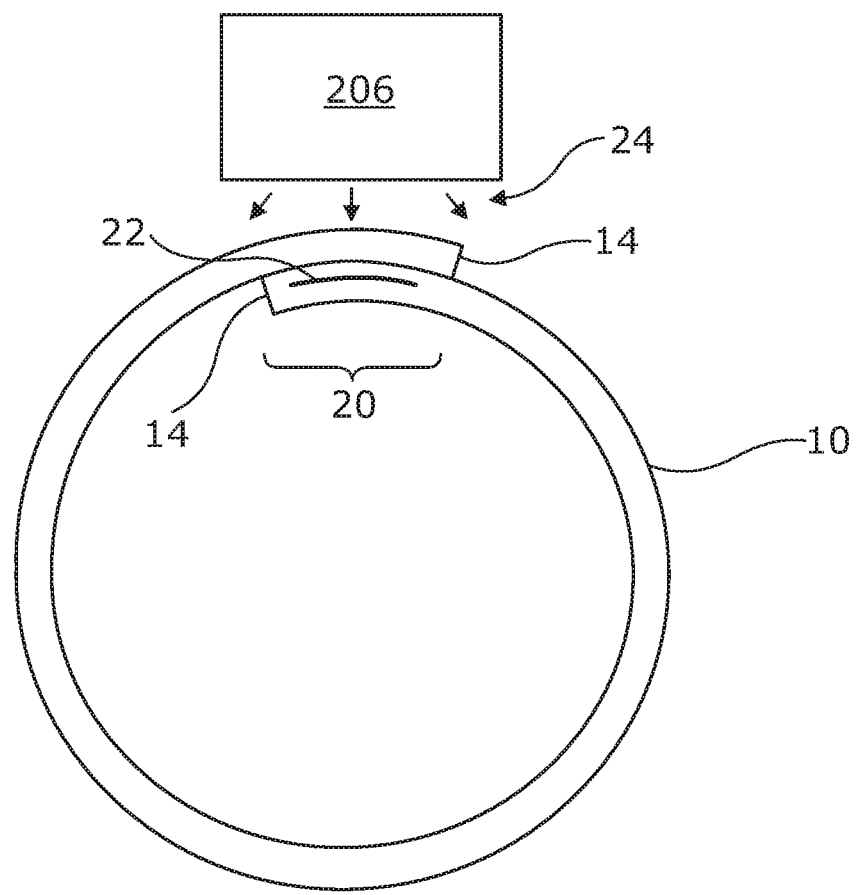
FIG. 4 shows in cross section an example of a seam being formed by the apparatus of FIGS. 2 and 3.

In other embodiments, casing whilst drilling may employ the techniques shown by FIGS. 2 to 4. In this example, the welding head 904 forms the permanent longitudinal seam in the pipe 10 at the top of the borehole 400 as the member 10 comes off the reel 302 and wraps around the drill string. The pipe is welded at its full diameter in which it is installed in the wellbore, rather than being temporary welded at a reduced diameter whilst it is towed into the borehole 400. The weight of the drill string in this case can be used to provide sufficient force to move the casing into the borehole 400 as drilling progresses.

In conventional schemes, the drill string is typically removed from the borehole, whilst a new section of case is fitted to the top of the casing and used to hammer down the existing casing in the borehole. This becomes progressively difficult unless the casing is much smaller than the borehole. This has a significant effect on the volume of product that can flow. This also means that the casing must be grouted in place once the borehole is complete. Repeat trips with the drill string also add hugely to the cost of drilling, not to mention the huge cost and energy needed to ship meal pipes to the drilling head end. The preferred embodiments of the apparatus 900 described above have the ability to reduce some or all of these problems by casing the borehole 400 in a single run. The techniques can be used with any suitable drilling technology, i.e. hydraulic or electric powered drill bits, or drilling by rotating the drill string.

The main joining techniques described in the examples is thermoplastic welding and particularly susceptor welding where the joining devices emit energy to cause the material to head and the weld to form. However, it will be appreciated that the principles disclosed herein extend to other joining techniques, such as using adhesive bonding, where the energy emitted by the joining devices heats the adhesive such that the adhesive bond can form.

All of the techniques disclosed herein can apply to new pipes—free standing or within boreholes and to pipe lining where the thin cross section of a BRC relative to its strength and barrier capability can provide a liner with much less occlusion of the bore of the pipe to be re-lined. The apparatus described can be used to lay pipes of long lengths, e.g. 100 s of meters or kilometres. A spool of coiled member can contain enough BRC for a pipe 5 km long.

Embodiments of the present invention have been described with particular reference to the example illustrated. However, it will be appreciated that variations and modifications may be made to the examples described within the scope of the present invention.

The invention claimed is:

1. An apparatus for joining a longitudinal seam in a tube, the apparatus comprising:
   a slit tube arranged to be deployed by progressively unwinding a coiled member into an extended form, wherein the member transitions from a flat form when coiled to a slit tube form when extended in which form the member is resiliently biased such that it automatically forms a slit tube form when extended, the member having first and second longitudinal edges that overlap in the extended form in an edge region and having at least one susceptor local to a respective one of the longitudinal edges, and wherein the member is a bistable composite comprising fibre reinforced thermoplastic layers, being stable in its coiled form and in its extended form;
   a joining device positioned relative to the member to provide electromagnetic energy to the susceptor in the edge region of the member in its extended form to cause heating, the member being relatively transparent to electromagnetic energy away from the susceptor so as to provide heating localised to the longitudinal edges of the member,
   the apparatus being arranged to provide relative movement of the joining device with the member such that the energy provided to the edge region progressively joins together the longitudinal edges of the slit tube as the member passes the joining device and thereby form a longitudinal seam in the tube.

2. The apparatus according to claim 1, comprising:
   a spool for progressively unwinding the coiled member into the extended form;
   the joining device being positioned downstream of the spool arranged such that it progressively joins together the longitudinal edges of the slit tube as the member passes the joining device as it unwinds from the spool.

3. The apparatus according to claim 2, comprising a cooling device downstream of the joining device arranged to direct cooling airflow at the seam to cool the seam after the longitudinal edges of the slit tube have been joined.

4. The apparatus according to claim 2, comprising a drive mechanism including a pinch wheel drive between the spool and the joining device to provide said relative movement of the joining device with the member.

5. The apparatus according to claim 2, wherein the apparatus is movable such that apparatus can move as the joined tube is progressively formed leaving the joined tube in situ as new portions are uncoiled and joined.

6. The apparatus according to claim 1, wherein the joining device is arranged to provide the energy to contiguous portions of the edge region to form a continuous seam.

7. An apparatus for joining a longitudinal seam in a tube, the apparatus comprising:
   a slit tube arranged to be deployed by progressively unwinding a coiled member into an extended form, wherein the member transitions from a flat form when coiled to a slit tube form when extended in which form the member is resiliently biased, the member having first and second longitudinal edges that overlap in the extended form in an edge region;
   a joining device positioned relative to the member to provide energy to the edge region of the member in its extended form to cause heating;
   a drive mechanism to provide relative movement of the joining device with the member such that the energy provided to the edge region progressively joins together the longitudinal edges of the slit tube as the member passes the joining device and thereby form a longitudinal seam in the tube;
   a detector downstream of the joining device for testing the join integrity in the seam; and
   a control system in communication with the detector and the drive mechanism, the control system being arranged to receive a signal from the detector indicating a portion of the tube an unsound join, and in response either:
      A) to transmit a control signal to the drive mechanism to back up the drive mechanism such that the portion of tube with the unsound join is passed again past the joining device and the join reformed, or
      B) provide a control signal to a second joining device located after the detector to cause the second joining device to reform the join of the portion of tube with the unsound join.

8. An apparatus for joining a longitudinal seam in a tube, the apparatus comprising:
   a slit tube arranged to be deployed by progressively unwinding a coiled member into an extended form, wherein the member transitions from a flat form when coiled to a slit tube form when extended in which form the member is resiliently biased, the member having first and second longitudinal edges that overlap in the extended form in an edge region;
   a spool for holding the coiled member such that an end of the member in the extended form can be fed into a borehole;
   a device for towing the extended member into the borehole until the member has reached a desired position;
   a joining device positioned relative to the member to provide energy to the edge region of the member in its extended form to cause heating, wherein the joining device comprises a pig arranged to move through the borehole down the inside of the extended member such that the energy provided to the edge region progressively joins together the longitudinal edges of the slit tube as the pig passes along the inside of the tube and thereby form a longitudinal seam in the tube.

9. The apparatus according to claim 8, wherein the pig is used to tow the extended member into the borehole and is reversible in direction when moving through the borehole down the inside of the extended member.

10. The apparatus according to claim 8, wherein the pig comprises a propulsion device for moving through the borehole.

11. The apparatus according to claim 10, wherein the propulsion device is reversible.

12. The apparatus according to claim 10, comprising an umbilical cable attached to the pig and a drive device means for the umbilical cable to propel the pig through the borehole by way of retracting the umbilical cable.

13. The apparatus according to claim 8, wherein the member comprises a thermoplastic and the joining device is arranged to cause a thermoplastic weld to join together the longitudinal edges of the slit tube.

14. The apparatus according to claim 8, wherein the member comprises an adhesive applied to one or both edges of the member and the joining device is arranged to cause an adhesive bond to join together the longitudinal edges of the slit tube.

15. The apparatus according to claim 14, wherein the member comprises a susceptor in the region of the seam and the joining device in the pig is arranged to provide electro-magnetic energy to the susceptor to cause heating of the edges of the member.

16. The apparatus according to claim 8, comprising a joining device positioned between the reel and the borehole arranged to temporarily join the slit tube member at a reduced diameter compared with the diameter of the tube in its resiliently biased form, wherein the pig is arranged to break the temporary joins as it passes along the inside of the tube.

17. The apparatus according to claim 16, wherein the temporary join line is along the outer edge of the overlap, keeping the join boundary clean.

18. The apparatus according to claim 8, wherein the pig has a greater diameter than the diameter of the tube in its resiliently biased form such that it expands the tube as it passed along the inside of the extended member prior to joining it at the expanded diameter.

19. The apparatus according to claim 8, wherein the pig comprises a detector downstream of the joining device for testing the join integrity.

20. The apparatus according to claim 8, wherein the pig is configured to orientate itself relative to the seam, such that the joining device and/or detector are directed to the area of the seam.

21. The apparatus according to claim 8, wherein a drill string is used to tow the extended member into the borehole and/or the pig is incorporated into a drill string.

* * * * *